Oct. 6, 1936. A. E. R. PETERKA ET AL 2,056,688
WEATHERTIGHT BOLT
Filed Nov. 15, 1934  3 Sheets-Sheet 1

INVENTORS.
AUGUST E. R. PETERKA
BY KARL A. ECKHARDT
Kwis, Hudson & Kent
ATTORNEYS.

Oct. 6, 1936.   A. E. R. PETERKA ET AL   2,056,688
WEATHERTIGHT BOLT
Filed Nov. 15, 1934   3 Sheets-Sheet 2

INVENTORS.
AUGUST E. R. PETERKA
BY   KARL A. ECKHARDT
Kwis, Hudson & Kent
ATTORNEYS.

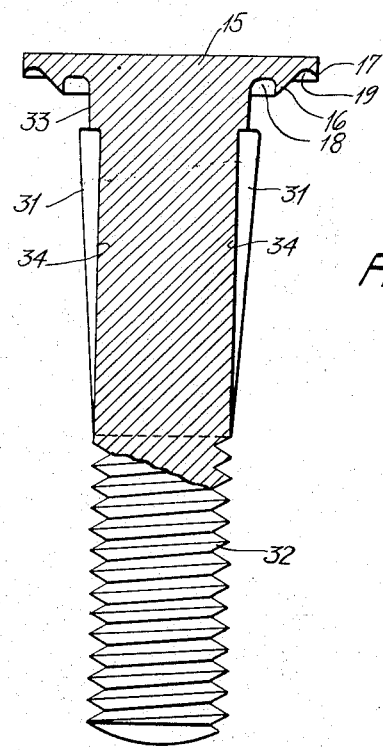
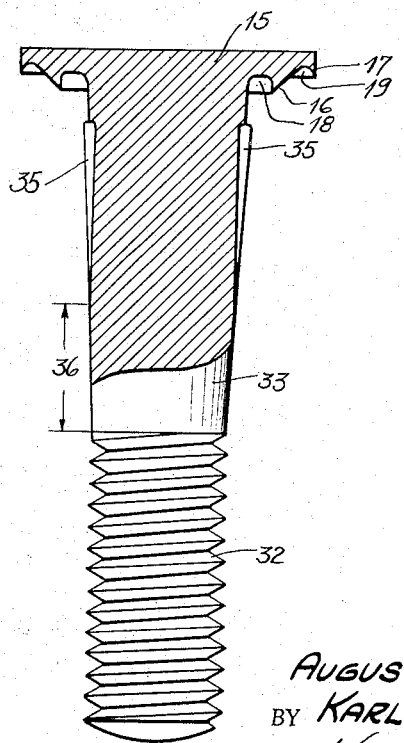

Patented Oct. 6, 1936

2,056,688

UNITED STATES PATENT OFFICE 2,056,688

WEATHER-TIGHT BOLT

August E. R. Peterka and Karl A. Eckhardt, Cleveland, Ohio, assignors to The Lamson & Sessions Company, Cleveland, Ohio, a corporation of Ohio Application November 15, 1934, Serial No. 753,172

4 Claims. (Cl. 85—9)

This invention relates to improvements in weather-tight bolts, particularly bolts which are adapted to prevent the passage of water in either direction.

Weather-tight bolts are used frequently in the floors of structures such as freight cars, when the bolts are mounted vertically, usually with their heads uppermost. Such bolts are also used however in the walls of such structures, when the heads are placed on the inner surface of the wall and the nuts are applied to the opposite ends of the bolts where they project through the outer surface of the wall. As heretofore constructed weather-tight bolts are designed to prevent the passage of water around the head of the bolt, but there is usually nothing to prevent the entrance of water into the bolt hole from the nut end of the bolt, as may and does occur where such bolts are used in the walls of freight cars. The present invention is designed to prevent moisture from entering the outer end of the bolt hole, causing decay of the wooden member of the structure and corrosion of the bolt itself, which would result in eventually loosening the bolts and weakening the entire assembly.

One of the objects of the invention therefore is the provision of a bolt which is so constructed as to prevent the entrance of moisture into the bolt hole from either direction, and particularly from the nut end of the bolt.

Another object is the provision of a bolt which shall be weather-tgiht from the nut end and shall at the same same time resist turning movement when it is driven or drawn into the bolt hole.

A further object of the invention is the provision of two depending ribs on the head of the bolt, the depth of the inner rib being greater than that of the outer rib in order that the greater sealing action may be closer to the hole where the splintering resulting from the drilling of the hole is most pronounced, the outer rib acting as a supplemental seal where the splintering is of a comparatively small extent.

Other objects and features of novelty will appear as we proceed with the description of those embodiments of the invention which, for the purposes of the present application, we have illustrated in the accompanying drawings, in which Fig. 1 is an elevational view, partially in section, of a bolt embodying our invention.

Figs. 11 and 12 are elevational views, partly in central longitudinal section, of two other modifications of the invention.

Figure 7:
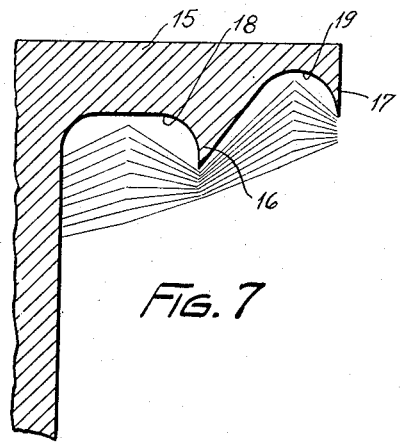
Fig. 7 is a fragmental central longitudinal sectional view of the head of the bolt on an enlarged scale, indicating in a diagrammatic way the compression of the wood fibers effected by the concentric ribs on the bolt head.

Referring first to the bolt illustrated in Figs. 1 to 4 inclusive, this being the preferred form of the invention, we have a bolt with a head 15 which, in the present instance, is shown flat, but may have any desired contour on its upper face. On its lower side the head is provided with two concentric depending ribs 16 and 17, the inner rib 16 being separated from the shank of the bolt by groove 18, and the two ribs 16 and 17 being separated from each other by a groove 19. Rib 16 is at a lower elevation than rib 17, considering the bolt as occupying a vertical position. Since most of the applications of the bolt are in more or less rough structures, the drilling of the holes in which the bolts are used results frequently in split and torn fibers. This stepped formation of the two ribs 16 and 17 is adapted to effectively meet this condition, that is to say, the deeper rib 16 is closer to the hole where the splintering of the fibers is greatest, and the greatest compression is therefore needed in order to insure satisfactory sealing against the entrance of moisture. The auxiliary rib 17 on the other hand is of less depth, but is nevertheless effective because at its distance from the bolt hole the splintering of the wood is considerably less pronounced. The force required to draw the rib 17 into the wood is therefore less than that which would be required if both ribs were of the same depth and that depth were sufficient to accomplish a satisfactory seal below the inner rib. The action of the ribs in compressing the wood fibers is indicated in Fig. 7.

Figure 3:
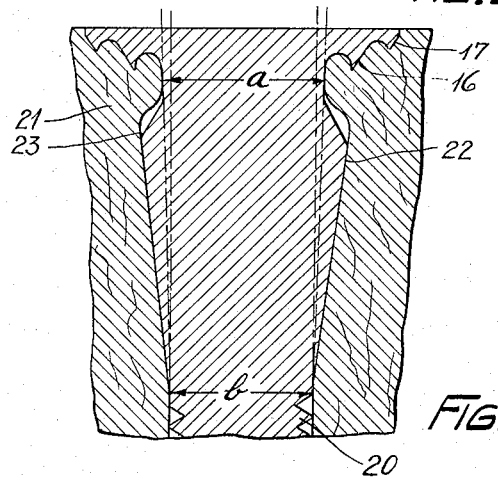
Fig. 3 is a longitudinal central sectional view taken substantially on the line 3—3 of Fig. 2.

The lower end of the shank of the bolt is threaded as indicated at 20. Above this threaded portion there is an intermediate portion 21, that is a portion between the threads and the head of the bolt, which has an upper diameter greater than the major diameter of the threaded portion of the shank and which tapers down to a diameter at its juncture with the threads substantially equal to the outer diameter of the threads. In Fig. 3 these upper and lower diameters are indicated at $a$ and $b$, respectively.

Figure 2:
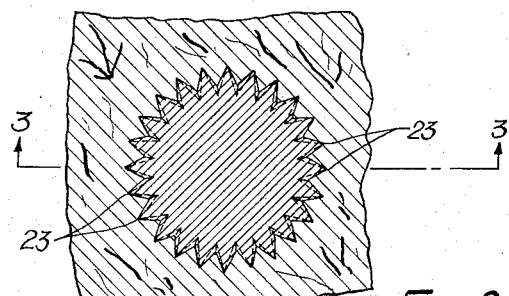
Fig. 2 is a cross sectional view of the bolt embedded in wood, the view corresponding substantially with the line 2—2 of Fig. 1.

Extending outwardly from the tapered portion of the shank there are a series of longitudinal splines or ribs 22. These splines have their greatest depth at a point 23 near their upper ends. At this point they are substantially V-shaped in cross section, as shown in Fig. 2. From this point the splines taper off toward their lower ends where they run out. They are also gradually flattened toward their lower ends, their contour at an intermediate point being shown in Fig. 4. From the point 23 the upper ends of the splines taper quite rapidly down to the smooth part of the tapered shank 21 appreciably below the head of the bolt.

When this bolt is driven into a bolt hole in a piece of lumber or drawn into the same by the tightening down of the nut on the outer end of the bolt, the taper in the shank itself, that is from the $b$ diameter to the $a$ diameter, serves to compress the wood fibers and increase their resistance to the passage of moisture. The ribs 22 however further increase the compression of the fibers and have a like effect, while serving the additional and minor function of preventing rotation of the bolt.

Assuming that the size of the bolt hole is substantially the same as the outer diameter of the threads, as it should be for this particular bolt, the gradually tapered splines 22 act to spread the fibers and crowd them into the grooves between the splines without shearing and tearing the fibers as would occur if the splines were not tapered. Since the taper is continuous, there is a continuous contact between the compressed fibers and the bolt throughout the length of the splines, and the natural elastic properties of the wood will force the compressed material back into the flutes between the splines.

The rib 16 is of approximately the same diameter as the splines 22 at their deepest point 23. When the bolt is driven home into the wood, the fibers between the adjacent splines 22 and above the point 23 are free to expand and come together again, and this action is assisted by the rib 16 which retains the fibers and crowds them into the groove 18.

Figure 5:
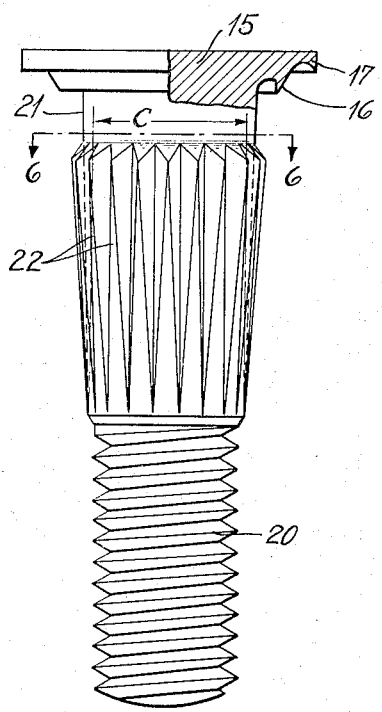
Fig. 5 is a view similar to Fig. 1 of a modified form of the invention.
Figure 4:
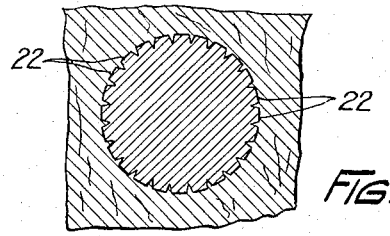
Fig. 4 is a transverse section similar to Fig. 2, taken substantially on the line 4—4 of Fig. 1.
Figure 6:
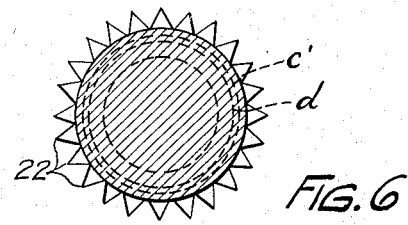
Fig. 6 is a transverse sectional view taken substantially on the line 6—6 of Fig. 5.

The bolt illustrated in Figs. 5 and 6 is designed for use where the bolt hole is made somewhat larger than the outer diameter of the threads. The size of the bolt hole is indicated by the line $c$ in Fig. 5, and by the circle $c'$ in Fig. 6. The outer diameter of the threads is shown by the line $d$ in Fig. 6. It will therefore be observed that the splines 22 on the tapered part of the shank in this case bear the same relation to the bolt hole as they do in the case of the first described form of the invention, and will have precisely the same sealing effect.

Figure 8:
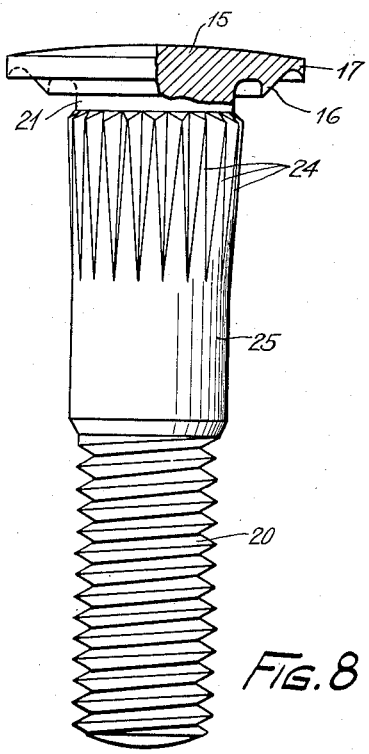
Fig. 8 is an elevational view of a further modified form of the invention.

In Fig. 8 the bolt illustrated is somewhat similar to that of Figs. 5 and 6. In this modification the splines 24 project from a shank portion 25 which is of uniform cross section instead of being tapered. The splines themselves are tapered however in the same manner as in the previously described forms of the invention. The splines 24 may extend throughout any part or all of the shank portion 25 of the bolt. In the case of relatively long bolts it will usually be desirable to form the splines on the upper part only of the shank 25, as illustrated in this figure, since the rolling of relatively long splines in a bolt increases the cost out of proportion to the benefits realized.

Figure 9:
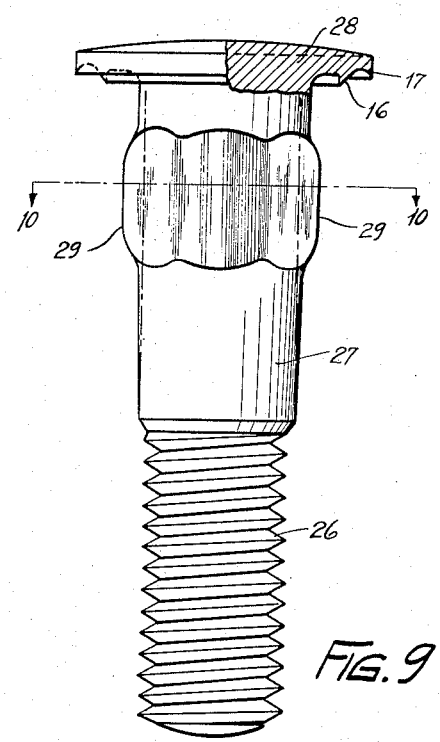
Fig. 9 is an elevational view of still another form of the invention.
Figure 10:
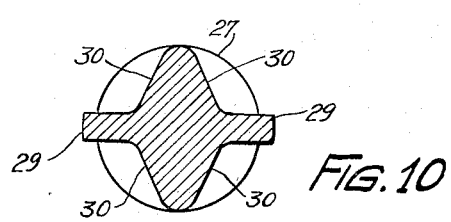
Fig. 10 is a transverse sectional view of the same taken substantially on the line 10—10 of Fig. 9.

In Figs. 9 and 10 a considerably different form of the invention is illustrated. In this case there is a threaded portion 26, and an intermediate shank portion 27, which is at least as large at its lower end as the outer diameter of the threads 26, and gradually increases in diameter toward the head 28. The shank 27 is therefore tapered downwardly in order that when driven into the bolt hole it may compress the fibers of the wood around the hole and seal the latter. This smooth tapered shank is further provided with suitable means for preventing rotation, which in the illustrated case consists of a pair of wings 29 pressed out of the metal of the shank and rounded or beveled off at their lower ends to permit them to be forced into the wood readily. The wood fibers displaced in this way will be partially accommodated by the cavities 30 which result from the formation of the wings.

This latter form of bolt functions in substantially the same way as do the other forms, except that the sealing of the nut end of the bolt is effected entirely by the taper on the smooth shank rather than by such taper in conjunction with tapered splines.

In that form of the invention which is illustrated in Fig. 11, there are splines 31 which are tapered, as in the previous forms of the invention. The root diameter of the splines in this figure is the same throughout their length, and in the case illustrated is substantially the same as the outer diameter of the threads 32, although if desired it could be greater than that diameter, and it would be advisable to have it greater if the bolt hole were of greater diameter than the outer diameter of the threads. The blank from which this bolt is made has a tapered shank, the taper being indicated by the upper part 33 of the shank. In order that the root diameter of the splines may be the same all the way up, in other words in order that the bottoms of the grooves between splines may correspond with parallel lines 34, the tapered shank before the rolling operation must correspond in diameter at every point in its length with the pitch diameter of the splines at that point.

Fig. 12 represents a bolt that is similar to that of Fig. 11, but where the splines 35 do not extend throughout the length of the shank 33. In other words the blanks from which these two bolts are made may be precisely the same, having a continuous taper from the head 15 downwardly to the threaded portion 32. Because of the shorter splines this bolt, therefore, has a smooth tapered portion 36 which enters the bolt hole and may start to compress the wood fibers before the splines make contact with the wood.

Figure 1:
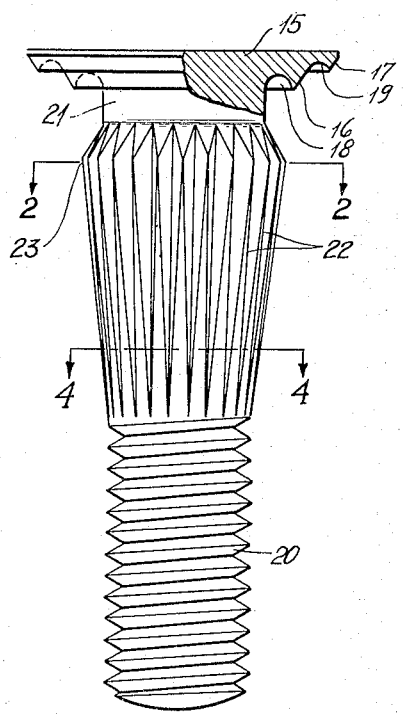

The compression of wood fibres by the bolts of Figs. 11 and 12 is of course less than that produced by the use of the bolts of Figs. 1, 5, and 8, where the root diameters of the splines conform with the taper; in other words where the compression is caused partly by the taper of the shank and partly by the taper of the splines themselves independently of the shank. In Fig. 11 the taper of the finished bolt is in the splines alone, and this is true of Fig. 11 also in so far as the splined part of the bolt is concerned.

Variations from the described structure may be employed. Accordingly we desire it to be understood that the scope of the invention is to be regarded as defined exclusively by the appended claims rather than by the foregoing description or accompanying illustrations.

Having thus described our invention, we claim:

1. In a bolt, a shank, a head, said bolt having a shank encircling fillet at the junction of the shank with the head, a depending rib on the head forming the outer wall of said fillet, said head having a second shank encircling fillet therein on the outer side of said rib at a higher level than the first named fillet and having a second depending rib forming the outer wall of said second fillet, said second rib being arranged at a higher level than said first named rib.

2. In a bolt, a shank, a head, said bolt having a shank encircling fillet at the junction of the shank and the head, a depending rib on the head forming the outer wall of said fillet, said head having a second shank encircling fillet therein on the outer side of said rib above the level of said first named fillet, and having a second depending rib forming the outer wall of said second fillet, the lower edge of said second rib being in substantially the same plane as the top of said first named fillet.

3. In a bolt of the character described, a head, a shank having a threaded portion and an intermediate tapered portion, said intermediate portion having its smaller diameter substantially as great as the maximum diameter of the threaded portion, the diameter of the intermediate portion gradually increasing from adjacent said threaded portion toward the head of the bolt, and a series of tapered longitudinal splines on said intermediate tapered portion gradually increasing in depth toward the upper ends thereof.

4. A wooden structure having a bolt hole therethrough and a bolt mounted in said hole, said bolt comprising a head, a shank, a threaded portion on the outer end of the shank, and an intermediate portion between the head and threaded portion, said intermediate portion carrying a plurality of straight longitudinal splines, the root diameter of the intermediate splined portion at all points thereof being no less than the outer diameter of the threaded portion, and the cross sectional area of the intermediate portion including the splines increasing from the threaded portion toward the head, said head having a depending shank encircling rib, whereby when the bolt is drawn into the bolt hole by the tightening down of its nut, the bolt is held from turning by the splines, the entrance of moisture to the bolt hole around the head end of the bolt is prevented by the depending rib, and the intermediate portion is wedged into the hole to prevent the passage of moisture into the hole from the threaded end of the bolt.

AUGUST E. R. PETERKA.
KARL A. ECKHARDT.